United States Patent
Cao et al.

(10) Patent No.: US 9,983,435 B2
(45) Date of Patent: May 29, 2018

(54) BACKLIGHT MODULE AND DISPLAY DEVICE

(71) Applicant: Shenzhen China Star Optoelectronics Technology Co., Ltd., Shenzhen, Guangdong (CN)

(72) Inventors: Qian Cao, Guangdong (CN); Jianyu Chang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days. days.

(21) Appl. No.: 14/418,617

(22) PCT Filed: Jan. 16, 2015

(86) PCT No.: PCT/CN2015/070929
§ 371 (c)(1),
(2) Date: May 10, 2016

(87) PCT Pub. No.: WO2016/106872
PCT Pub. Date: Jul. 7, 2016

(65) Prior Publication Data
US 2016/0245484 A1    Aug. 25, 2016

(30) Foreign Application Priority Data
Dec. 31, 2014  (CN) .......................... 2014 1 0855251

(51) Int. Cl.
*G02F 1/13* (2006.01)
*G02F 1/13357* (2006.01)
*G02F 1/1335* (2006.01)

(52) U.S. Cl.
CPC .. *G02F 1/133603* (2013.01); *G02F 1/133605* (2013.01)

(58) Field of Classification Search
CPC ..................... G02F 1/133605; G02F 1/133603
See application file for complete search history.

(56) References Cited

U.S. PATENT DOCUMENTS 5,816,691 A    10/1998  Gordin et al.
7,178,951 B1 *  2/2007  Hsiao ................ G02F 1/133611
                                                        362/362

(Continued)

FOREIGN PATENT DOCUMENTS

CN    1719317 A    1/2006
CN    2752810 Y    1/2006
(Continued)

OTHER PUBLICATIONS

Office Action and Search Report, dated May 5, 2016, China.
International Search Report and Written Opinion, dated Jan. 16, 2015, China.

*Primary Examiner* — Mariceli Santiago
(74) *Attorney, Agent, or Firm* — Kim Winston LLP

(57) ABSTRACT

A backlight module and a display device are disclosed. The present disclosure relates to the technical field of display, whereby the technical problem of dark spots existing at the corners of the liquid crystal display device in the prior art can be solved. The backlight module comprises a reflective sheet and a plurality of light sources that are arranged on said reflective sheet, wherein the reflective sheet at edges and corners of said backlight module has a certain slope or curvature; and adjusting members, arranged at corners of said backlight module, so that the slope or curvature of the reflective sheet at the corners of said backlight module matches the slope or curvature of the reflective sheet at the edges of said backlight module.

6 Claims, 2 Drawing Sheets

(56) References Cited

U.S. PATENT DOCUMENTS

| | | | |
|---|---|---|---|
| 9,389,460 B2* | 7/2016 | Park | G02F 1/133605 |
| 2007/0103937 A1* | 5/2007 | Kim | G02F 1/133605 362/613 |
| 2007/0121320 A1* | 5/2007 | Arai | G02F 1/133603 362/247 |
| 2015/0261043 A1* | 9/2015 | Lee | G02F 1/133308 349/58 |

FOREIGN PATENT DOCUMENTS

| | | | |
|---|---|---|---|
| CN | 1831604 A | | 9/2006 |
| CN | 101046581 A | | 10/2007 |
| CN | 101650491 A | | 2/2010 |
| CN | 203349082 U | | 12/2013 |
| CN | 203455561 U | | 2/2014 |
| CN | 203731204 U | | 7/2014 |
| JP | 07169309 A | * | 7/1995 |
| JP | 10134619 A | * | 5/1998 |
| WO | 2012060313 A1 | | 5/2012 |

* cited by examiner

BACKLIGHT MODULE AND DISPLAY DEVICE

CROSS REFERENCE TO RELATED APPLICATION

The present application claims benefit of Chinese patent application CN 201410855251.8, entitled "Backlight Module and Display Device" and filed on Dec. 31, 2014, which is incorporated herein by reference.

FIELD OF THE INVENTION

The present disclosure relates to the technical field of display, and particularly to a backlight module and a display device.

BACKGROUND OF THE INVENTION

With the development of display technology, the liquid crystal display device has become the most commonly used display device.

The liquid crystal display device mainly comprises a backlight module and a liquid crystal module. The direct type backlight module is a commonly used backlight module, and mainly comprises a reflective sheet and a plurality of point light sources that are arranged on the reflective sheet. The reflective sheet usually has a rectangular shape, and the edges and corners of the reflective sheet are folded, so that the edges and corners thereof can form inclined surfaces with a certain slope or curved surfaces with a certain curvature. In this manner, the edges and corners of the reflective sheet can reflect the light emitted by the point light sources more effectively, and thus the light-exiting efficiency of the backlight module can be improved.

Since each corner of the reflective sheet is located at an intersection point of two edges, the slope (or curvature) of the corners of the reflective sheet is lower than the slope (or curvature) of the edges of the reflective sheet. Consequently, the light reflected by the corners of the reflective sheet is relatively less, and thus dark spots would exist at the corners of the liquid crystal display device.

SUMMARY OF THE INVENTION

The present disclosure aims to provide a backlight module and a display device so as to solve the technical problem of dark spots existing at the corners of the liquid crystal display device.

The present disclosure provides a backlight module, comprising: a reflective sheet; a plurality of light sources that are arranged on said reflective sheet, wherein the reflective sheet at edges and corners of said backlight module has a certain slope or curvature; and adjusting members, arranged at corners of said backlight module, so that the slope or curvature of the reflective sheet at the corners of said backlight module matches the slope or curvature of the reflective sheet at the edges of said backlight module.

According to one embodiment, said adjusting members are protrusions that are arranged below the reflective sheet at the corners of said backlight module.

According to another embodiment, said adjusting members are reflective elements, which have a certain slope or curvature matching the slope or curvature of the reflective sheet at the edges of said backlight module.

Preferably, said reflective elements and said reflective sheet are connected with each other in a fixed manner.

Further, said reflective elements and said reflective sheet are connected with each other in a fixed manner by clamps or screw bolts.

Or, said reflective elements and said reflective sheet are connected with each other in a fixed manner by adhesive.

Preferably, said light sources are light-emitting diodes.

Further, said backlight module is a direct type backlight module.

The present disclosure further provides a display device, which comprises a liquid crystal module and the aforesaid backlight module.

The following beneficial effects can be brought about according to the present disclosure. In the backlight module provided by the present disclosure, the slope or curvature of the reflective sheet at the corners of said backlight module can match the slope or curvature of the reflective sheet at the edges of said backlight module through arranging adjusting members. In this manner, when the light emitted by the light sources is reflected by the edges and corners of the backlight module, a same reflection effect can be achieved. Therefore, the edges and corners of the backlight module have the same brightness, and the technical problem of dark spots existing at the corners of the liquid crystal display device can be solved.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The drawings necessary for explaining the embodiments are introduced briefly below to illustrate the technical solutions of the embodiments of the present disclosure more clearly.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

The embodiments of the present disclosure provide a backlight module, which can be used in liquid crystal TVs, liquid crystal display devices, mobile phones, tablet personal computers and other display devices. The backlight module comprises a reflective sheet and a plurality of light sources that are arranged on said reflective sheet, wherein the reflective sheet at edges and corners of said backlight module has a certain slope or curvature. The backlight module further comprises adjusting members that are arranged at corners of said backlight module, so that the slope or curvature of the reflective sheet at the corners of said backlight module matches the slope or curvature of the reflective sheet at the edges of said backlight module.

In the backlight module provided by the embodiments of the present disclosure, the slope or curvature of the reflective sheet at the corners of said backlight module can match the slope or curvature of the reflective sheet at the edges of said backlight module through arranging adjusting members. In this manner, when the light emitted by the light sources is reflected by the edges and corners of the backlight module, a same reflection effect can be achieved. Therefore, the edges and corners of the backlight module have the same brightness, and the technical problem of dark spots existing at the corners of the liquid crystal display device can be solved.

Embodiment 1

Figure 1:
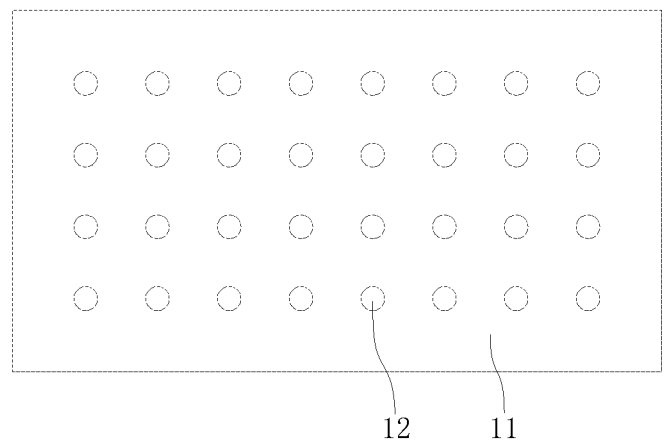
FIG. 1 schematically shows a backlight module according to embodiment 1 of the present disclosure.

As shown in FIG. 1, the backlight module provided by the embodiment of the present disclosure can be used in liquid crystal TVs, liquid crystal display devices, mobile phones, tablet personal computers and other display devices. In particular, the backlight module can be a direct type backlight module. The backlight module comprises a reflective sheet 11 and a plurality of light sources 12 that are arranged on the reflective sheet 11, wherein the reflective sheet at edges and corners of the backlight module has a certain curvature. The light sources 12 are preferably Light-Emitting Diodes (LEDs).

Figure 2:
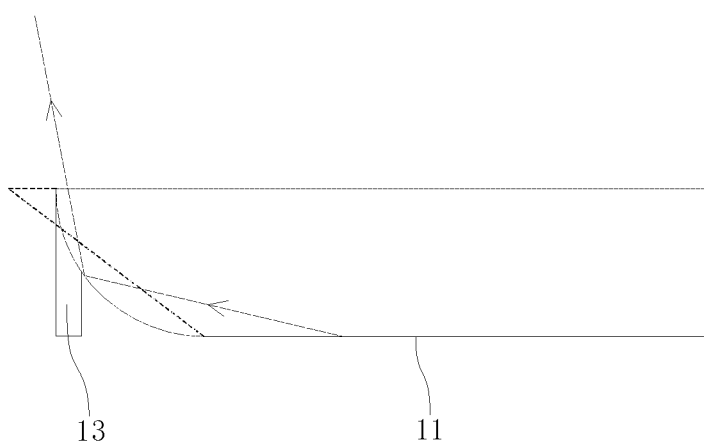
FIG. 2 schematically shows a corner of the backlight module according to embodiment 1 of the present disclosure.

The backlight module further comprises adjusting members. As shown in FIG. 2, according to the present embodiment, the adjusting members are protrusions 13 that are arranged below the reflective sheet 11 at the corners of the backlight module. The dotted lines in FIG. 2 show the shape of the reflective sheet before the protrusions 13 are provided. It can be seen that, the shape of the reflective sheet 11 at the corners of the backlight module can be changed through arranging the protrusions 13. In this manner, the reflective sheet 11 at the corners of the backlight module has a larger curvature, which matches the curvature of the reflective sheet 11 at the edges of the backlight module. The curvature of the reflective sheet 11 at the corners of the backlight module is preferably equal to the curvature of the reflective sheet 11 at the edges of the backlight module. Of course, a certain difference can also exist between the above two curvatures.

In the backlight module provided by the embodiment of the present disclosure, the curvature of the reflective sheet 11 at the corners of the backlight module can match the curvature of the reflective sheet 11 at the edges of the backlight module through arranging the protrusions 13 at the corners of the reflective sheet 11. In this manner, when the light emitted by the light sources 12 is reflected by the edges and corners of the backlight module, a same reflection effect can be achieved. Therefore, the edges and corners of the backlight module have the same brightness, and the technical problem of dark spots existing at the corners of the liquid crystal display device can be solved.

It should be noted that, in other implementation modes, an inclined surface can be formed at each corner of the reflective sheet by the protrusion, so that the slope at the corners of the reflective sheet matches the slope at the edges of the reflective sheet.

Therefore, the edges and corners of the backlight module have the same brightness, and the technical problem of dark spots existing at the corners of the liquid crystal display device can be solved.

Embodiment 2

Figure 3:
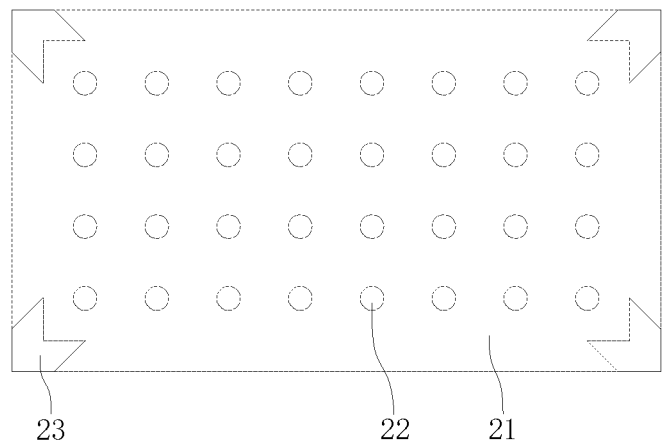
FIG. 3 schematically shows a backlight module according to embodiment 2 of the present disclosure.
Figure 4:
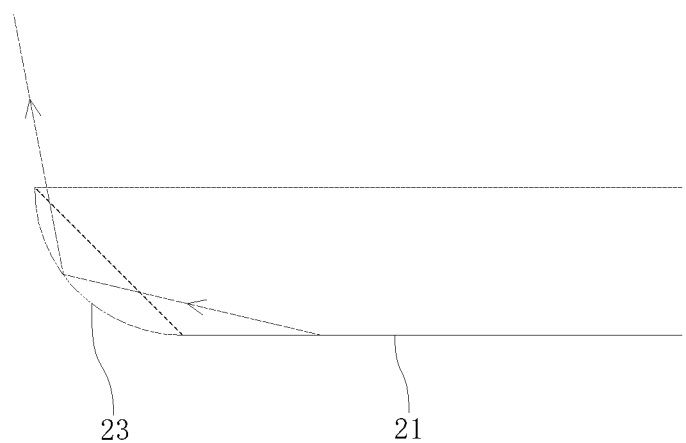
FIG. 4 schematically shows a corner of the backlight module according to embodiment 2 of the present disclosure.

As shown in FIGS. 3 and 4, the backlight module provided by the embodiment of the present disclosure can be used in liquid crystal TVs, liquid crystal display devices, mobile phones, tablet personal computers and other display devices. In particular, the backlight module can be a direct type backlight module. The backlight module comprises a reflective sheet 21 and a plurality of light sources 22 that are arranged on the reflective sheet 21, wherein the reflective sheet at edges and corners of the backlight module has a certain curvature.

The backlight module further comprises adjusting members. According to the present embodiment, the adjusting members are reflective elements 23 that are arranged at the corners of the reflective sheet 21. The reflective elements 23 have a certain curvature matching the curvature of the reflective sheet at the edges of the backlight module. During the manufacturing of the backlight module, the four corners of the reflective sheet 21 can be cut off at first, so that four notches can be formed. Then, the reflective elements 23 are respectively mounted in the four notches of the reflective sheet 21 to serve as respective parts of the reflective sheet 21.

The dotted line in FIG. 4 shows the shape of the reflective sheet 21 before the four corners thereof are cut off. It can be seen that, the shape of the reflective sheet 21 at the corners of the backlight module can be changed through arranging the reflective elements 23. In this manner, the reflective sheet 21 at the corners of the backlight module has a larger curvature, which matches the curvature of the edges of the reflective sheet 21. The curvature of the reflective elements 23 is preferably equal to the curvature of the reflective sheet 21 at the edges of the backlight module. Of course, a certain difference can also exist between the above two curvatures.

As a preferred solution, the reflective elements 23 and the reflective sheet 21 are connected with each other in a fixed manner so as to ensure the stability of the connection between the reflective elements 23 and the reflective sheet 21, and to avoid the undesirable phenomena that the reflective elements 23 are shed or displaced from the reflective sheet 21. Specifically, the reflective elements 23 and the reflective sheet 21 can be connected with each other in a fixed manner by clamps or screw bolts. Of course, in other implementation modes, the reflective elements and the reflective sheet can also be connected with each other in a fixed manner by adhesive.

In the backlight module provided by the embodiment of the present disclosure, the curvature of the reflective elements 23 at the corners of the backlight module can match the curvature of the reflective sheet 21 at the edges of the backlight module through arranging the reflective elements 23 at the corners of the reflective sheet 21. In this manner, when the light emitted by the light sources 22 is reflected by the edges and corners of the backlight module, a same reflection effect can be achieved.

Therefore, the edges and corners of the backlight module have the same brightness, and the technical problem of dark spots existing at the corners of the liquid crystal display device can be solved.

It should be noted that, in other implementation modes, each reflective element can have an inclined surface, and the slope of the inclined surface matches the slope at the edges of the reflective sheet. Therefore, the edges and corners of the backlight module can have the same brightness, and the technical problem of dark spots existing at the corners of the liquid crystal display device can be solved.

A display device is also provided by the embodiments of the present disclosure, which may be embodied as a liquid crystal TV, a liquid crystal display device, a mobile phone, a tablet personal computer, etc. The display device comprises a liquid crystal module and a backlight module provided by the above embodiment 1 or embodiment 2.

Since the display device provided by the embodiments of the present disclosure has the same technical features as the backlight module provided by the above embodiment 1 and embodiment 2, they can solve the same technical problem and achieve the same technical effect.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A backlight module, comprising:
   a reflective sheet;
   a plurality of light sources that are arranged on said reflective sheet, wherein the reflective sheet at edges and corners of said backlight module has a certain slope or curvature; and
   adjusting members, arranged at corners of said backlight module, wherein the adjusting members are configured to adjust the slope or curvature of the reflective sheet at the corners of said backlight module so that the slope or curvature of the reflective sheet at the corners of said backlight module matches the slope or curvature of the reflective sheet at the edges of said backlight module,
   wherein said adjusting members are protrusions that are arranged below the reflective sheet at the corners of said backlight module.

2. The backlight module according to claim 1, wherein said light sources are light-emitting diodes.

3. The backlight module according to claim 1, wherein said backlight module is a direct type backlight module.

4. A display device, comprising a liquid crystal module and a backlight module, wherein said backlight module comprises:
   a reflective sheet and a plurality of light sources that are arranged on said reflective sheet, wherein the reflective sheet at edges and corners of said backlight module has a certain slope or curvature; and
   adjusting members, arranged at corners of said backlight module, wherein the adjusting members are configured to adjust the slope or curvature of the reflective sheet at the corners of said backlight module so that the slope or curvature of the reflective sheet at the corners of said backlight module matches the slope or curvature of the reflective sheet at the edges of said backlight module
   wherein said adjusting members are protrusions that are arranged below the reflective sheet at the corners of said backlight module.

5. The display device according to claim 4, wherein said light sources are light-emitting diodes.

6. The display device according to claim 4, wherein said backlight module is a direct type backlight module.

* * * * *